(12) United States Patent
Akaboshi et al.

(10) Patent No.: US 8,282,275 B2
(45) Date of Patent: Oct. 9, 2012

(54) DEVICE FOR DETECTING ABNORMALITY IN A SECONDARY BATTERY

(75) Inventors: Takayuki Akaboshi, Okazaki (JP); Nobuyuki Kawai, Okazaki (JP); Toshihide Tanaka, Okazaki (JP); Toshiya Shimpo, Nisshin (JP); Shoji Narita, Okazaki (JP)

(73) Assignees: Mitsubishi Jidosha Kogyo Kabushiki Kaisha, Tokyo (JP); Mitsubishi Jidosha Engineering Kabushiki Kaisha, Okazaki-Shi (JP)

( * ) Notice: Subject to any disclaimer, the term of this patent is extended or adjusted under 35 U.S.C. 154(b) by 0 days.

(21) Appl. No.: 12/778,570

(22) Filed: May 12, 2010

(65) Prior Publication Data

US 2010/0309949 A1 Dec. 9, 2010

(30) Foreign Application Priority Data

Jun. 4, 2009 (JP) ................ 2009-134806

(51) Int. Cl.
*G01K 1/12* (2006.01)
*G01K 1/14* (2006.01)
*G01N 25/30* (2006.01)
*G01N 27/00* (2006.01)

(52) U.S. Cl. ........... 374/152; 374/208; 374/4; 374/141; 374/45; 374/57; 320/134; 324/434

(58) Field of Classification Search ............... 320/134, 320/126, 154, 150, 35, 112, FOR. 127, FOR. 134, 320/FOR. 147, FOR. 148; 374/4, 5, 43, 44, 374/45, 29, 30, 57, 100, 170, 183, 185, 163, 374/208, 141, 143; 324/426, 430, 434, 439, 324/441, 446, 450, 424, 421, 417, 415
See application file for complete search history.

(56) References Cited

U.S. PATENT DOCUMENTS

| | | | | |
|---|---|---|---|---|
| 1,982,548 A | * | 11/1934 | Stave | 337/383 |
| 5,588,064 A | * | 12/1996 | McSwiggen et al. | 381/312 |
| 5,764,063 A | * | 6/1998 | Katou et al. | 324/434 |
| 6,337,559 B1 | * | 1/2002 | Sato | 320/134 |
| 6,462,551 B1 | | 10/2002 | Coates et al. | |
| 6,538,415 B1 | * | 3/2003 | Fang et al. | 320/150 |
| 7,059,769 B1 | * | 6/2006 | Potega | 374/185 |
| 7,129,706 B2 | * | 10/2006 | Kalley | 324/426 |
| 7,262,605 B2 | * | 8/2007 | Seo et al. | 324/522 |
| 7,438,988 B2 | * | 10/2008 | Misu et al. | 429/98 |
| 2002/0163339 A1 | * | 11/2002 | Friel et al. | 324/434 |
| 2004/0226153 A1 | * | 11/2004 | Karasawa et al. | 29/2 |
| 2004/0226765 A1 | * | 11/2004 | Mathews et al. | 180/68.5 |
| 2005/0231169 A1 | | 10/2005 | Seo et al. | |

(Continued)

FOREIGN PATENT DOCUMENTS

CN 201213145 Y * 3/2009

(Continued)

*Primary Examiner* — Gail Verbitsky
(74) *Attorney, Agent, or Firm* — Birch, Stewart, Kolasch & Birch, LLP

(57) ABSTRACT

There are provided an electrically-conductive connecting plate that connects electrode terminals of a plurality of battery cells; a fastening member that fastens the connecting plate and each of the electrode terminals together; temperature-detecting means that is placed near a fastened portion between the connecting plate and the corresponding electrode terminal which are fastened together with the fastening member, and detects temperature around the fastened portion; and abnormality-judging means that judges abnormality in the battery cells or the fastening member on the basis of temperature detected by the temperature-detecting means.

4 Claims, 4 Drawing Sheets

U.S. PATENT DOCUMENTS

| | | | |
|---|---|---|---|
| 2006/0091850 A1* | 5/2006 | Kim | 320/112 |
| 2006/0091851 A1* | 5/2006 | Kim | 320/112 |
| 2006/0103346 A1* | 5/2006 | Misu et al. | 320/107 |
| 2007/0139004 A1* | 6/2007 | Satsuma | 320/114 |
| 2007/0139017 A1* | 6/2007 | Marchand et al. | 320/150 |
| 2008/0036425 A1* | 2/2008 | Tashiro et al. | 320/154 |
| 2008/0238357 A1* | 10/2008 | Bourilkov et al. | 320/106 |
| 2010/0202490 A1* | 8/2010 | Ishikawa et al. | 374/165 |
| 2010/0238632 A1* | 9/2010 | Shiraki et al. | 361/709 |
| 2011/0020686 A1* | 1/2011 | Yamamoto et al. | 429/120 |
| 2011/0189509 A1* | 8/2011 | Kang et al. | 429/7 |
| 2012/0031517 A1* | 2/2012 | Yoshida et al. | 138/103 |
| 2012/0092018 A1* | 4/2012 | Scheucher | 324/426 |

FOREIGN PATENT DOCUMENTS

| | | | |
|---|---|---|---|
| JP | 6-133468 A | | 5/1994 |
| JP | 9-199107 A | | 7/1997 |
| JP | 9-306468 A | | 11/1997 |
| JP | 11-162527 A | | 6/1999 |
| JP | 2001159292 A | * | 6/2001 |
| JP | 2002-246074 A | | 8/2002 |
| JP | 2006252825 A | * | 9/2006 |
| JP | 2008-241421 A | | 10/2008 |
| WO | WO 2009/016491 A2 | | 2/2009 |
| WO | WO 2010095314 A1 | * | 8/2010 |

* cited by examiner

DEVICE FOR DETECTING ABNORMALITY IN A SECONDARY BATTERY

BACKGROUND OF THE INVENTION

1. Field of the Invention

The present invention relates to a device for detecting abnormality in a secondary battery, and more specifically, to a technology of detecting a looseness in a fastening member that fastens a connecting plate for connecting battery cells and a cell terminal together.

2. Description of the Related Art

A conventional lithium ion battery installed in an electric vehicle has a configuration in which battery modules made up of a plurality of battery cells are connected together in parallel or series, and is designed to supply electric power to the vehicle.

In order to connect a plurality of battery cells in this manner, it is common to connect the terminals of the battery cells together by fastening the terminals to an electrically-conductive connecting plate such as a bus bar with fastening members.

The foregoing configuration, however, has the problem that the fastening members that fasten the connecting plate and the terminals together become loose once in a while due to vibration or the like. Such looseness in the fastening members increases contact resistance between the terminals and the connecting plate, and incurs energy loss.

A well-known way to avoid such a problem is to attach a pressure sensor to each fastening member and detect looseness in fastening members (see Unexamined Japanese Patent Publication No. 9-306468).

An electric vehicle is equipped with a number of battery modules, and accordingly, many fastening members are utilized. A battery pack formed by connecting a plurality of battery cells likewise uses a lot of fastening members.

Since the fastening members have their respective pressure sensors, the conventional technology disclosed in the above-mentioned patent document 1 involves a large number of pressure sensors, and accordingly requires high parts cost. On top of that, the battery pack inevitably contains a lot of wires. This deteriorates maintainability and is therefore undesirable.

SUMMARY OF THE INVENTION

The invention has been made in order to solve the above-mentioned problems. It is an object of the invention to provide a device for detecting abnormality in a secondary battery, which is capable of detecting a looseness in a fastening member with a simple configuration.

In order to achieve the above object, the device for detecting abnormality in a secondary battery according to the invention has an electrically-conductive connecting plate that connects electrode terminals of a plurality of battery cells; a fastening member that fastens the connecting plate and each of the electrode terminals together; temperature-detecting means that is placed near a fastened portion between the connecting plate and the corresponding electrode terminal which are fastened together with the fastening member, and detects temperature around the fastened portion; and abnormality-judging means that judges abnormality in the battery cells or the fastening member on the basis of temperature detected by the temperature-detecting means.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

One embodiment of the invention will be described below with reference to the attached drawings.

Figure 1:
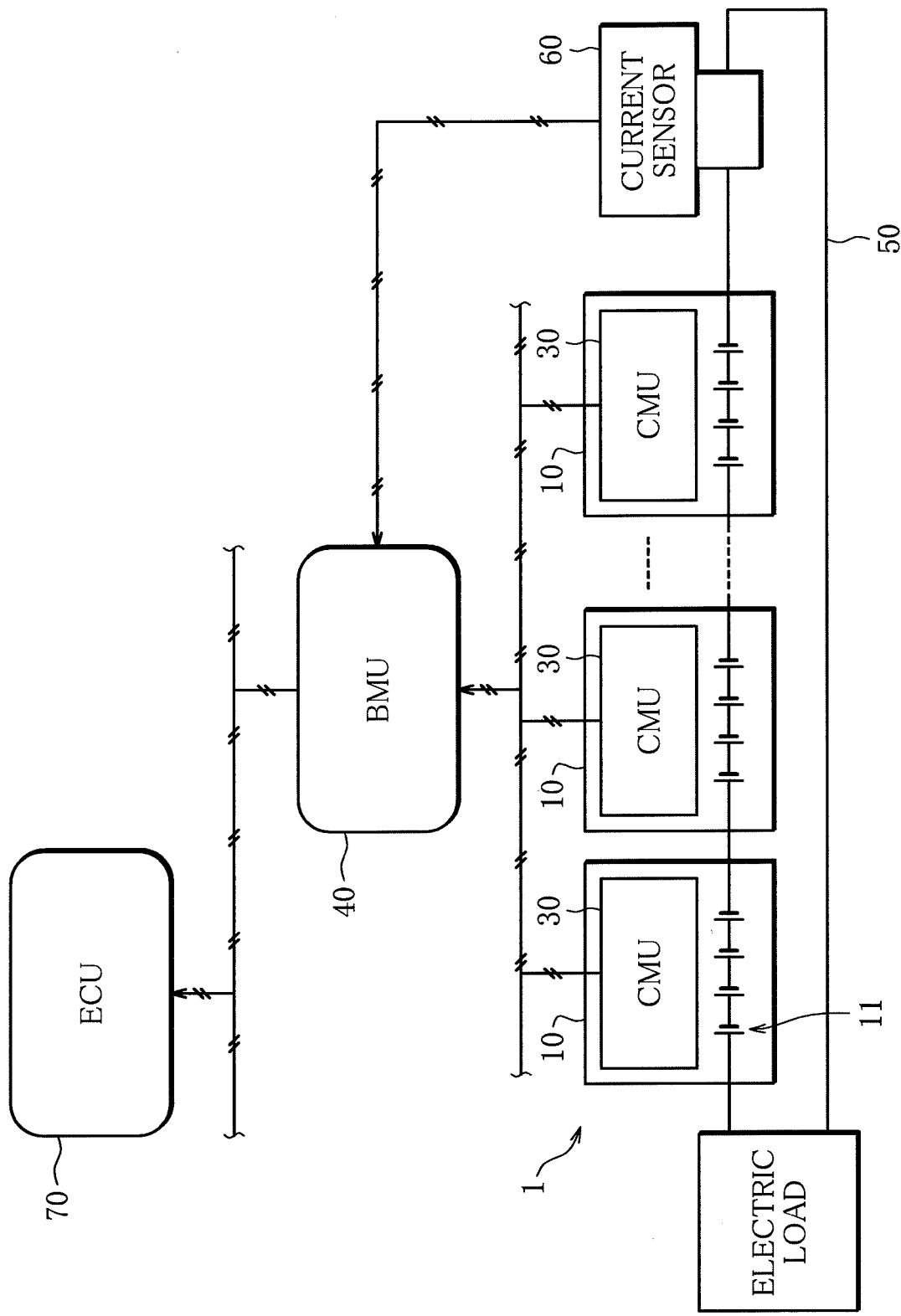
FIG. 1 is a system chart showing a schematic configuration of a device for detecting abnormality in a secondary battery according to the invention.

FIG. 1 is a system chart showing a schematic configuration of a device for detecting abnormality in a secondary battery according to the invention.

As shown in FIG. 1, a drive battery 1 installed in an electric vehicle is formed by connecting a plurality of battery modules 10 in series. The electric vehicle includes a charging path led from an external power source, and stores power by using a charger that is supplied with power from the charging path.

Each of the battery modules 10 includes a plurality of battery cells 11. The battery module 10 is further provided with a cell monitoring unit (hereinafter, referred to as CMU) 30 that monitors a charging status of the battery module 10. A current sensor 60 for detecting input/output currents of the entire drive battery 1 is interposed in a wire 50 connecting the battery modules 10 together in series.

The CMU 30 is connected to a battery management control unit (abnormality-judging means; hereinafter, referred to as BMU) 40. The BMU 40 receives information about the charging statuses of the battery modules 10 from the CMUs 30 and also receives an input/output current value of the drive battery 1 from the current sensor 60. The BMU 40 then transmits the battery information to an electrical control unit (ECU) 70.

Figure 2:
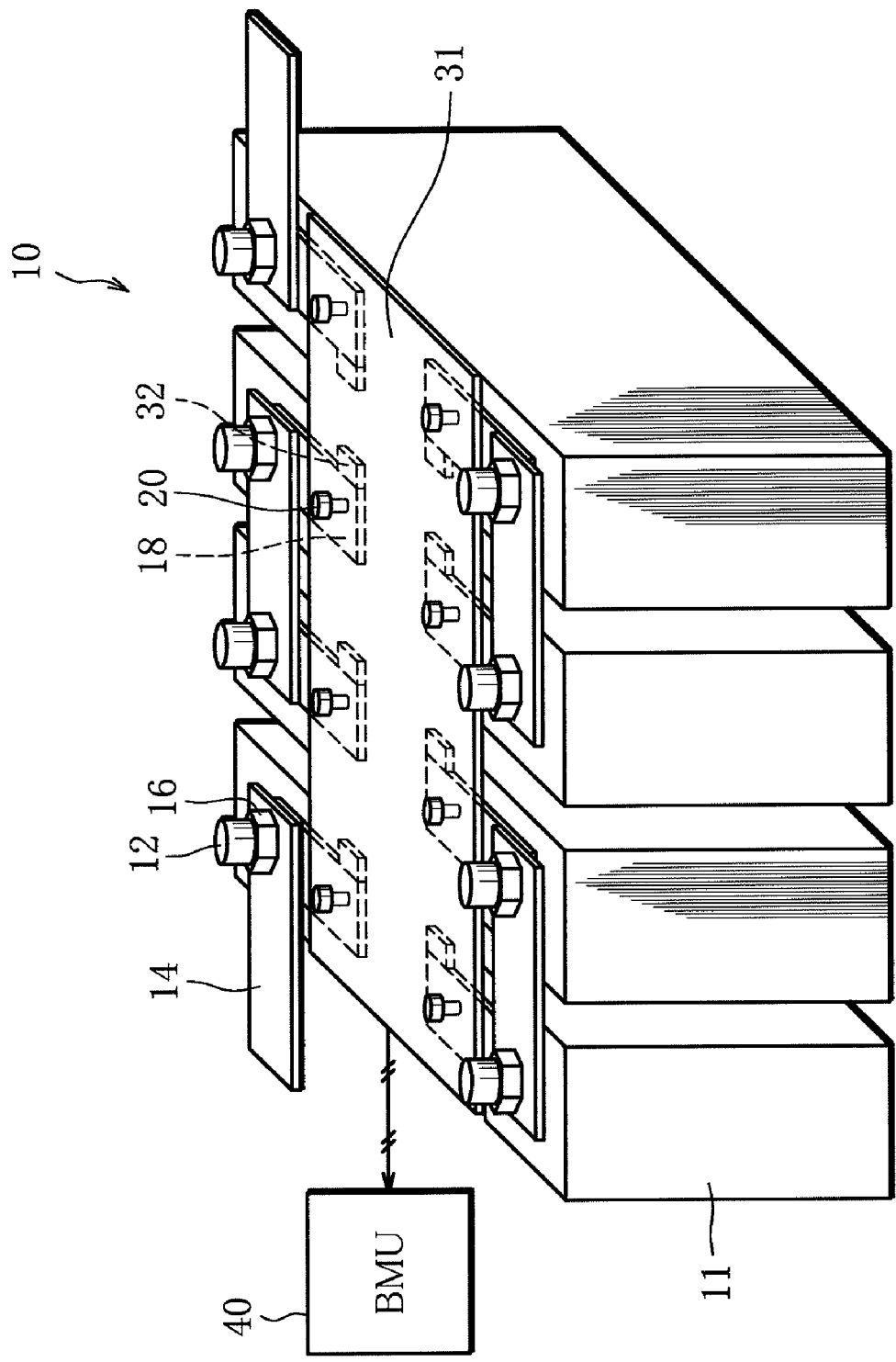
FIG. 2 is a schematic configuration view of the device for detecting abnormality in a secondary battery according to the invention.

FIG. 2 is a schematic configuration view of the battery modules 10 making up the device for detecting abnormality in a secondary battery according to the invention.

As illustrated in FIG. 2, the battery modules 10 are formed by fastening electrode terminals 12 of the battery cells together in series with fastening members (for example, nuts) 16 by using bus bars (connecting plates) 14. Each of the electrode terminals 12 is connected with a first end of a metal plate 18 with electricity conductivity and heat conductivity, whereas a metal terminal 20 is joined to a second end of the metal plate 18. The metal terminal 20 is electrically and thermally joined to the electrode terminal 12 through the metal plate 18, and is capable of detecting the voltage of the corresponding battery cell 11. In this specification, the faces of the battery cells 11, on which the electrode terminals are located, are defined as upper faces.

In the battery module 10, a battery-monitoring device substrate 31 with the CMU 30 is placed on the upper faces of the metal plates 18 so as to extend across the battery cells 11 making up the battery module 10, and is fastened to the metal plates 18 with the metal terminals 20. The battery-monitoring device substrate 31 is provided with thermistors (temperature-detecting means) 32.

Figure 3:
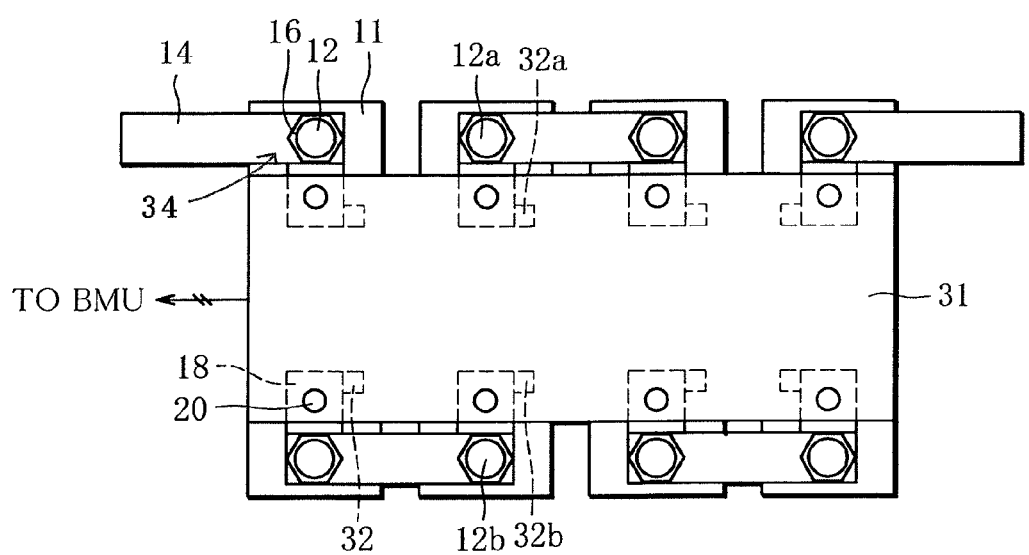
FIG. 3 is a top view of FIG. 2.

To be concrete, as illustrated in FIG. 3, the thermistors 32 are attached to the battery-monitoring device substrate 31 to be located near the fastened portions 34 of the fastening members 16 and adjacent to the metal plates 18 so that heat is transmitted through the metal plates 18 and wires (not shown) to the thermistors 32. As stated later, each of the thermistors 32 detects heat around the corresponding fastened portion 34, which is transmitted from the electrode terminal 12 through the metal plate 18.

Referring to FIG. 2 again, the battery-monitoring device substrate 31 is connected to an input side of the BMU 40. On the basis of the information from the battery-monitoring device substrate 31, the BMU 40 monitors the conditions (voltage, temperature, etc.) of all the battery cells 11 making up a battery pack.

The following description is about operation of the device for detecting abnormality in a secondary battery, which is configured as described above, according to the invention.

When a load current flows through the bus bar 14, heat generates around the fastened portion 34 of the fastening member 16, for example, in the electrode terminal 12, in proportion to contact resistance of the electrode terminal 12 with the bus bar 14 and the fastening member 16. In general, an electric vehicle like this one employs a high-voltage current used for the drive motor of the vehicle and a low-voltage current used for accessories installed in the vehicle. The current that flows through the bus bar 14 is a high-voltage load current. If there is looseness in the fastening member 16 fastening the electrode terminal 12 and the bus bar 14, the contact resistance grows greater, and heat value is increased. The heat generation in the electrode terminal 12 is transmitted through the metal plate 18 to the thermistor 32 provided to the battery-monitoring device substrate 31. In this manner, the thermistor 32 detects the heat generation caused in the electrode terminal 12. The heat value is proportional to the amount of load current. For this reason, as for the heat generation detected by the thermistor 32 when the load current is equal to or higher than a prescribed value (for example, 10 ampere), it is possible to make a clear distinction between the heat generation attributable to looseness in the fastening member 16 and the heat generation attributable to abnormality in the battery.

The following description is about abnormality-judgment processing in which it is determined that there is looseness in the fastening member 16 when the detected temperature is equal to or higher than the prescribed temperature.

Figure 4:
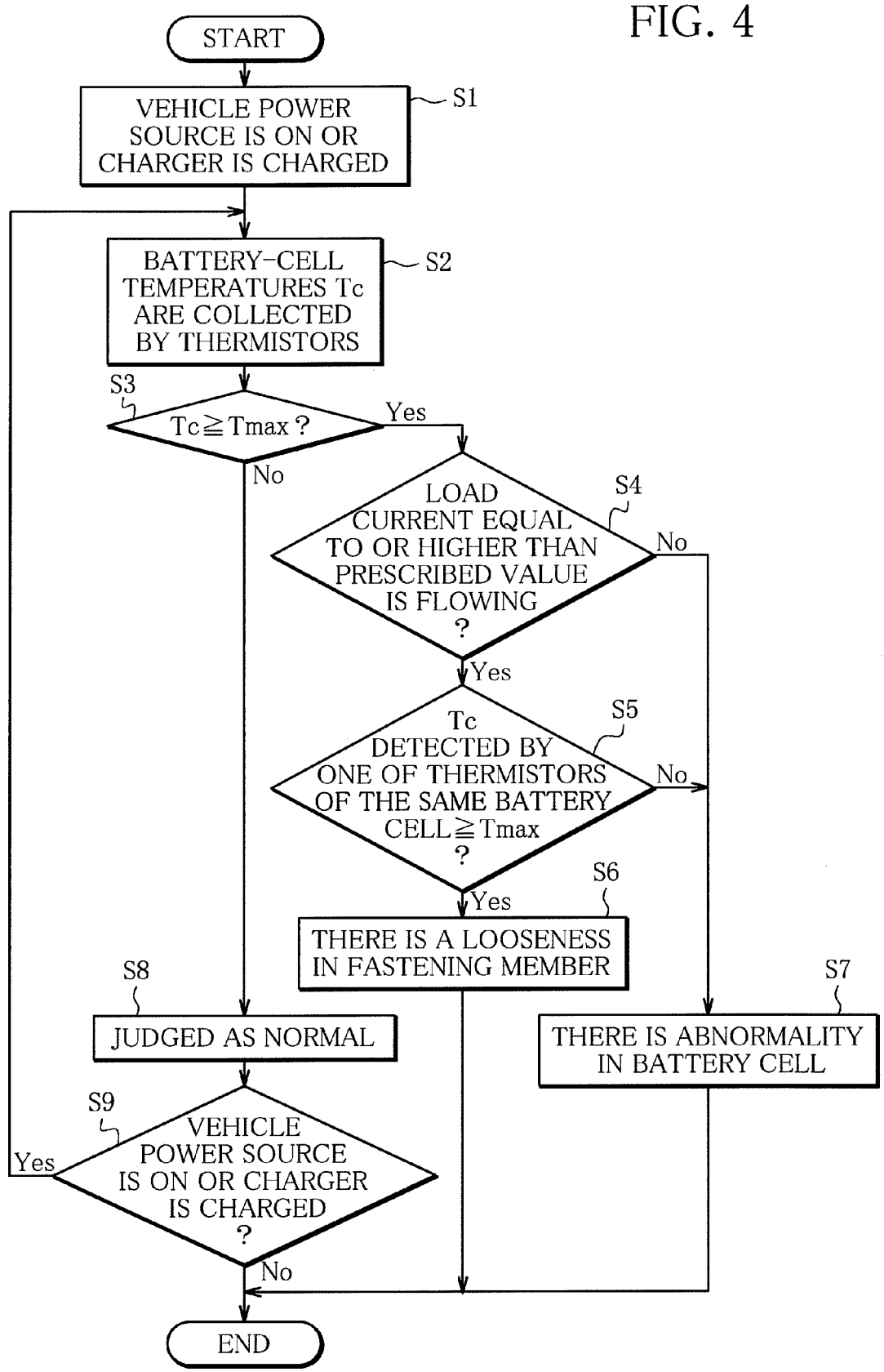
FIG. 4 is a flowchart showing a battery-cell abnormality detection routine that is carried out in the device for detecting abnormality in a secondary battery shown in FIG. 2.

FIG. 4 is a flowchart showing an abnormality judgment routine that is carried out by the BMU 40. The description will be provided below with reference to this flowchart.

In Step S1, the charger is charged by turning on a vehicle power source or by connecting a power connector to a 100V or 200V external power source.

Step S2 detects battery-cell temperatures Tc by using the thermistors 32 attached to the battery-monitoring device substrate 31, and collects the battery-cell temperatures Tc.

Step S3 makes a judgment as to whether the collected battery-cell temperatures Tc are equal to or higher than prescribed temperature Tmax. If the judgment is YES, the routine advances to Step S4.

Step S4 makes a judgment as to whether a load current equal to or higher than a prescribed value is flowing through the bus bar 14. If the judgment is YES, the routine moves to Step S5.

Step S5 makes a judgment as to whether either one of the two thermistors 32 that detect the temperatures of the same battery cell 11 has detected a temperature equal to or higher than the prescribed temperature Tmax.

More specifically, as illustrated in FIG. 3, it is judged whether either one of thermistors 32a and 32b for measuring the temperatures of electrode terminals 12a and 12b located in the same battery cell 11 has detected a temperature equal to or higher than the prescribed temperature Tmax. If the judgment is YES, the routine proceeds to Step S6.

Step S6 judges that there is looseness in the fastening member 16 that fastens the bus bar 14 and the electrode terminal 12 together.

If the judgment of Step S4 or S5 is NO, the routine advances to Step S7.

Step S7 determines that heat is generated in the battery cell 11, and judges that the battery cell 11 has abnormality.

If the judgment of Step S3 is NO, the routine moves to Step S8.

Step S8 judges that the battery cell 11 is normal, and advances the routine to Step S9.

In Step S9, a judgment is made as to whether the vehicle power source is ON or whether the charger is being charged. If the judgment is YES, the routine returns to Step S2. If the judgment is NO, the present battery-cell abnormality detection routine is ended.

According to the embodiment of the invention, the thermistor 32 attached to the battery-monitoring device substrate 31 is located adjacent to the metal plate 18. If the load current equal to or higher than the prescribed value flows through the bus bar 14, the thermistor 32 attached to the battery-monitoring device substrate 31 detects the temperature equal to or higher than the prescribed value. If either one of the thermistors 32a and 32b that detect the temperatures of the electrode terminals 12a and 12b, respectively, of the same battery cell 11 has detected a temperature equal to or higher than the prescribed value, it is determined that there is looseness in the fastening member 16 that fastens the electrode terminal 12 and the bus bar 14 together.

By this means, the thermistor 32 is capable of detecting the temperature of the battery cell 11 and even detecting the heat generation attributable to looseness in the fastening member 16 that fastens the electrode terminal 12 and the bus bar 14 together. Since the thermistor 32 is used both for the detection of the temperature of the battery cell 11 and for the detection of the temperature around the fastened portion 34 of the fastening member 16, costs are kept low.

Moreover, using the inexpensive thermistor as a temperature sensor also reduces parts cost.

Furthermore, a spot of temperature abnormality can be identified without difficulty. This reduces the time required for maintenance and improves working efficiency.

It is also possible to make a distinction between the temperature abnormality caused by abnormality in the battery cell 11 and the temperature abnormality caused by looseness in the fastening member 16.

The thermistor 32 is attached to the battery-monitoring device substrate 31, and the heat generation attributable to looseness in the fastening member 16 is transmitted to the metal plate 18 and the thermistor 32 provided to the battery-monitoring device substrate 31. Accordingly, there is no need for any complicated wiring, which enables the installation of the thermistor 32 in a small space.

This is the end of the description of the embodiment of the invention. However, the invention is not limited to the above-described embodiment.

For example, in the embodiment, the thermistors 32 are attached to the battery-monitoring device substrate 31, but the thermistors 32 may be attached to the bus bars 14 or the fastening members 16.

Although the thermistor 32 is used as a temperature sensor, the temperature sensor is not particularly limited to a thermistor. The temperature sensor could be anything as long as it is capable of detecting temperature.

The embodiment uses two thermistors to detect the temperature of each of the battery cells 11, but the number of thermistors does not have to be two.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for detecting abnormality in a secondary battery cell having a plurality of electrode terminals, comprising:
    an electrically-conductive connecting plate that connects each of the plurality of electrode terminals to other battery cells;
    a fastening member that fastens the connecting plate with one of the plurality of electrode terminals together;
    a metal plate, a first end of which being electrically and thermally connected to the one of the plurality of electrode terminals;
    a metal terminal joined to a second end, opposite to the first end, of the metal plate, the metal terminal being electrically and thermally joined to the one of the plurality of electrode terminals;
    temperature-detecting means placed near a fastened portion adjacent the fastening member and the metal plate, and detects temperature around the fastened portion; and
    abnormality judging means that judges abnormality in the fastening member on the basis of temperature detected by the temperature-detecting means, wherein
    the abnormality judging means detects looseness in the fastening member on the basis of the temperature detected by the temperature-detecting means, when a load current equal to or higher than a prescribed value is flowing from the corresponding electrode terminal to the connecting plate, and either one of the two temperature-detecting means detects temperature equal to or higher than a prescribed temperature.

2. The device for detecting abnormality in a secondary battery according to claim 1, wherein
    the temperature-detecting means is a thermistor.

3. The device for detecting abnormality in a secondary battery according to claim 1, further comprising:
    a battery-monitoring device that monitors conditions of the corresponding battery cell, the battery-monitoring device having a substrate connected to the second end of the metal plate, wherein
    the temperature-detecting means is attached to the substrate of the battery-monitoring device to be located adjacent to the metal plate.

4. The device for detecting abnormality in a secondary battery according to claim 2, further comprising:
    a battery-monitoring device that monitors conditions of the corresponding battery cell, the battery-monitoring device having a substrate connected to the second end of metal plate, wherein
    the temperature-detecting means is attached to the substrate of the battery-monitoring device to be located adjacent to the metal plate.

* * * * *